United States Patent [19]

Munk

[11] Patent Number: 4,458,051

[45] Date of Patent: Jul. 3, 1984

[54] POURABLE SOLID MIXTURE

[75] Inventor: Kurt Munk, Grenzach, Fed. Rep. of Germany

[73] Assignee: Ciba-Geigy Corporation, Ardsley, N.Y.

[21] Appl. No.: 419,662

[22] Filed: Sep. 20, 1982

Related U.S. Application Data

[62] Division of Ser. No. 237,198, Feb. 23, 1981, Pat. No. 4,401,776.

[51] Int. Cl.³ .......................... C08K 3/40; C08K 3/36; C08K 3/34
[52] U.S. Cl. .................................... 524/779; 524/780; 524/783; 524/785; 524/786; 524/787; 524/788; 524/789; 524/791
[58] Field of Search ............... 524/779, 780, 783, 785, 524/786, 787, 788, 789, 791, 456; 252/430; 523/440, 513

[56] References Cited

U.S. PATENT DOCUMENTS

| | | | |
|---|---|---|---|
| 3,405,088 | 10/1968 | Slocum | 524/456 |
| 4,075,154 | 2/1978 | Itoh et al. | 524/779 |
| 4,366,264 | 12/1982 | Wawzonek | 524/456 |

Primary Examiner—Lewis T. Jacobs
Attorney, Agent, or Firm—Luther A. R. Hall

[57] ABSTRACT

Polymerizable liquid synthetic resins, liquid reactive constituents of synthetic resins or liquid additives for plastics, in each case containing mineral fillers, are converted to dry, pourable mixtures by mixing with 0.25-5% by weight of a crystalline synthetic calcium silicate, which can be in diverse stages of hydration and has a high length/width ratio and width dimensions of less than 1 μm, it being possible, by this means, to employ the resins not only as casting resins but also as compression moulding resins and adhesives. In addition, handling and processability are improved.

7 Claims, No Drawings

POURABLE SOLID MIXTURE

This is a divisional of application Ser. No. 237,198, filed on Feb. 23, 1981, now U.S. Pat. No. 4,401,776, issued Aug. 30, 1983.

The present invention relates to a pourable solid mixture which consists of a liquid polymerisable synthetic resin, liquid reactive constituent for a plastic or liquid additive for a plastic, this component being provided with mineral fillers, and a crystalline synthetic calcium silicate.

In industry, spreadable for castable synthetic resins to which specific properties are imparted by the addition of fillers are frequently employed. In general, the fillers are mixed into the resins only shortly prior to processing. However, the processing of fillers is subject to safety regulations, which frequently can no longer be met by the processors.

The manufacturers of plastics are therefore increasingly adopting the practice of adding the fillers to the plastics beforehand and suppressing sedimentation of these fillers by adding sedimentation inhibitors. However, partial demixing of the solid and liquid components cannot always be entirely prevented by this means. A great disadvantage of the filled spreading and casting resins is that, because of the relatively high viscosity and the formation of sediments, they present difficulties in processing. A particular disadvantage is that these resins cannot be removed from the containers without leaving any residue; this, moreover, applies in the case of many of the materials used for the preparation and processing of plastics, for example in the case of liquid additives for plastics for liquid reactive constituents for the preparation of plastics, and is regarded as being uneconomical and can pollute the environment. It is extremely desirable to eliminate the unsolved problem of virtually complete withdrawal of liquid, filled components or liquid materials for the preparation and processing of plastics, and this is the object of the present invention.

The present invention relates to a pourable, solid mixture which contains, based on the total mixture, (a) 49.75–7.5 and preferably 44.7–7.5% by weight of a polymerisable liquid synthetic resin, of a liquid reactive constituent for a plastic or of a liquid additive for a plastic, (b) 50–87.5 and preferably 54.7–87.5% by weight of a mineral filler and (c) 0.25–5 and preferably 0.6–5% by weight of a crystalline synthetic calcium silicate, which can be in diverse stages of hydration and has a high length/width ratio and a width dimension of less than 1 $\mu$m.

In particular, the mixture contains component (a) in a proportion of 35–15% by weight and component (b) in a proportion of 64.4–80% by weight.

Suitable liquid synthetic resins are, for example, those which under the action of light, heat and/or catalysts can be polymerised during processing to give thermosetting end products. The resins are essentially self-crosslinkable synthetic resins, which in general are prepolymers or pre-adducts.

Examples of self-crosslinkable synthetic resins are: phenoplasts which are obtained from aldehydes and phenols, which can be alkylated phenols, and are prepared in a basic medium, aminoplasts, for example urea-formaldehyde resins or melamine-formaldehyde resins, alkyd resins and oil-modified alkyd resins, unsaturated polyesters, especially based on maleic acid, epoxide resins, especially based on bisphenol A, polyurethanes, unsaturated polyimides, especially based on bis-maleimides which can be C-alkylated, and silicones.

Suitable epoxide resins are in particular those which have, on average, more than one glycidyl group, $\beta$-methylglycidyl group or 2,3-epoxycyclopentyl group bonded to a hetero-atom (for example sulfur and preferably oxygen or nitrogen); preferred epoxide resins are bis-(2,3-epoxycyclopentyl) ether; di- and poly-glycidyl ethers of polyhydric aliphatic alcohols, such as 1,4-butanediol, or polyalkylene glycols, such as polypropylene glycols; di- or poly-glycidyl ethers of cycloaliphatic polyols, such as 2,2-bis-(4-hydroxycyclohexyl)-propane; di- and poly-glycidyl ethers of polyhydric phenols, such as resorcinol, bis-(p-hydroxyphenyl)-methane, 2,2-bis-(p-hydroxyphenyl)-propane (=diomethane), 2,2-bis-(4'-hydroxy-3',5'-dibromophenyl)propane or 1,1,2,2-tetrakis-(p-hydroxyphenyl)-ethane, or of condensation products of phenols with formaldehyde which are obtained under acid conditions, such as phenol novolacs and cresol novolacs; di- and poly-($\beta$-methylglycidyl)ethers of the abovementioned polyhydric alcohols or polyhydric phenols; polyglycidyl esters of polybasic carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidylaniline, N,N-diglycidyltoluidine or N,N,N',N'-tetraglycidyl-bis-(p-aminophenol)-methane; triglycidyl isocyanurate; N,N'-diglycidylethyleneurea; N,N'-diglycidyl-5,5-dimethyl-hydantoin, N,N'-diglycidyl-5-isopropyl-hydantoin and N,N'-diglycidyl-5,5-dimethyl-6-isopropyl-5,6-dihydrouracil.

Liquid pre-reacted adducts of such epoxide resins with curing agents for epoxide resins are also suitable.

The synthetic resins of component (a), which contain functional groups can also be reactive constituents of a plastic and be crosslinked with suitable curing agents or modified with suitable comonomers.

Suitable curing agents for epoxide resins are acid or basic compounds. Examples of suitable curing agents are: amines or amides, such as aliphatic, cycloaliphatic or aromatic primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylene-1,3-diamine, N,N-diethylpropylene-1,3-diamine, 2,2-bis-(4'-aminocyclohexyl)propane, 3,5,5-trimethyl-3-(aminomethyl)-cyclohexylamine ("isophorone-diamine"), Mannich bases, such as 2,4,6-tris-(dimethylaminomethyl)-phenol; m-phenylenediamine, p-phenylenediamine, bis-(4-aminophenyl)-methane, bis-(4-aminophenyl)-sulfone and m-xylylenediamine; adducts of acrylonitrile or monoepoxides, such as ethylene oxide or propylene oxide, with polyalkylenepolyamines, such as diethylenetriamine or triethylenetetramine; adducts of polyamines, such as diethylenetriamine or triethylenetetramine, in excess, and polyepoxides, such as diomethane polyglycidyl ethers; ketimines, for example of acetone or methyl ketone and bis-(p-aminophenyl)-methane; adducts of monophenols or polyphenols and polyamides; polyamides, especially those obtained from aliphatic polyamines, such as diethylenetriamine or triethylenetetramine, and dimerised or trimerised unsaturated fatty acids, such as dimerised linseed oil fatty acid (VERSAMID); polymeric polysulfides (THIOKOL); dicyandiamide, aniline-formaldehyde resins; polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenyl phosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6-endomethylene-$\Delta^4$-tetrahydrophthalic anhydride (=methylnadic anhydride), 3,4,5,6,7-hexachloro-3,6-endomethylene-$\Delta^4$-tetrahydrophthalic anhydride, succinic anhydride, adipic anhydride, trimethyladipic anhydride, azelaic anhydride, sebacic anhydride, maleic anhydride or decenylsuccinic anhydride, pyromellitic acid dianhydride or mixtures of such anhydrides.

Examples of suitable curing agents for polyurethanes and polyisocyanates are liquid, branched polyesters, linear polyesters, polyacetals, polyethers and polythioethers.

Suitable comonomers, for example for unsaturated polyesters or polyimides, are, for example, ethylenically unsaturated compounds such as styrene, acrylic acid esters or methacrylic acid esters.

Furthermore, the reactive constituent for a plastic can be a polymerisable monomer, which monomers are polymerised on their own or together with comonomers, for example polyfunctional epoxides and isocyanates or ethylenically unsaturated compounds.

Examples of liquid additives for plastics are polymerisation accelerators, polymerisation catalysts or polymerisation initiators, reactive diluents, stabilisers against light-induced or heat-induced degradation, plasticisers, antioxidants, fluorescent brighteners, flame retardants and processing assistants, such as flow improvers or mould release agents.

Examples of accelerators for epoxide resins are tertiary amines and their salts or quaternary ammonium compounds, for example 2,4,6-tris-(dimethylaminomethyl)phenol, benzylidimethylamine, 2-ethyl-4-methylimidazole and triamylammonium phenolate; or alkali metal alcoholates, for example sodium hexanetriolate, mono- or polyphenols, such as phenol or diomethane, or salicylic acid.

The mineral filler can be: glass, quartz, clay minerals, feldspars, silicates, carbonates, rock powders, alumina or hydrated aluminas, oxides, carbon, carbides or sulfates, and the materials can be synthetic or naturally occurring materials. Examples are: quartz powder, mica, talc, asbestos, slate flour, kaolin, wollastonite, powdered chalk, dolomite, magnesium carbonate, gypsum, barytes, aluminium oxide, bentones, silicic acid aerogel, lithopones, titanium dioxide, carbon black, graphite, metal oxides, glass powders, glass spheres, glass fibres, zinc sulfide, silicon carbide, cristoballite or a mixture of fillers. Quartz powder is preferred.

The fillers can be in fibre form to granular or pulverulent, and can be treated with adhesion promoters which promote binding of the polymer to the particles of the filler. Finely divided surface-active fillers are preferred.

The crystalline synthetic calcium silicate contains particles of elongated shape and can be rod-shaped to acicular. The width dimension is less than 1 $\mu$m and the internal surface area can be up about 100 $m^2/g$. The length/width ratio can be, for example, in the range from 10:1 to 200:1. The methods of preparation for synthetic calcium silicates of this type are known and are carried out on an industrial scale. The methods are hydrothermal reactions, in which lime and quartz sand are reacted with water under pressure at elevated temperatures, and the ratios can be varied in accordance with the desired end product.

Acicular crystalline xonotlite of the formula $Ca_6[(OH)_2/Si_6O_{17}]$ has proved particularly valuable.

The calcium silicate has to be added only in small amounts in order to achieve solidification of the liquid component (a), which is provided with fillers. The amount added depends on the type and the amount of filler.

The mixtures according to the invention can be prepared by simple mixing of the components in industrial equipment, such as stirred vessels, known for this purpose. Advantageously, all of the components are added together and the mixture is stirred until it has changed to a solid, dry and pourable material, which usually disintegrates into small crumbs. It is surprising that even with small amounts of these synthetic calcium silicates, the liquid to viscous component (a), which is provided with fillers, of the mixture according to the invention can be converted to a dry material, which has great industrial advantages with regard to handling and processing.

All of the filler can be incorporated in a synthetic resin or a reactive constituent, homogeneous distribution being maintained since demixing due to sedimentation can no longer take place. Pourable materials are very much easier to handle than viscous liquids. They can be removed from the containers without the use of auxiliaries, virtually no residues remaining in the containers, and as a result of this losses and expensive cleaning operations are avoided. A further advantage is the high storage stability of these mixtures according to the invention and the conversion of liquid casting resin systems into compression moulding resins, which constitutes an exension of the field of application. With the additives, according to the invention, for plastics, easier incorporation and better distribution of the additives in the substrate are achieved. Despite the small amount of synthetic calcium silicate added, markedly better mechanical properties, for example increased flexural strength, are, surprisingly, already observed in mouldings made of cured resins.

The synthetic resins according to the invention can, if desired, after the addition of conventional additives such as curing accelerators, be used as compression moulding resins, or, when liquefied by the addition of liquid components, for example reactive diluents, or by warming, or by the addition of fusible components, can be used as casting or spreading resins. Mixtures, according to the invention, of reactive constituents of plastics, for example an epoxide resin/curing agent mixture, can likewise be employed as compression moulding compositions and adhesives. Furthermore, it is possible to liquefy these reactive constituents with liquid reactants or by warming, to give casting or spreading resins. A further possible application is the preparation of compositions, which are relatively stable on storage, from reactive constituents, according to the invention, of synthetic resins, such as resin/curing agent or resin/curing accelerator. The possibility of reactions at the boundary surface between the resin and the curing agent component does indeed prevent unlimited storage, but the storage stability is sufficient to supply one-component systems to processing companies, which is particularly advantageous. The mixtures according to the invention can be liquefied under pressure and therefore can also be processed by the cold-press process.

The examples which follow illustrate the invention in more detail.

EXAMPLE 1

Preparation of a solid, pourable resin component from a liquid resin 100 g of diglycidyl hexahydrophthalate (epoxide content: 5.5–6.3 equivalent/kg), 126 g of extremely fine quartz powder, 210 g of quartz powder and 12 g of synthetic calcium silicate (xonotlite) are weighed together at room temperature into a tinplate box and mixed at room temperature for about 1 minute at 1,300 rpm with a paddle stirrer. Pourable crumbs about 2 mm in diameter form.

A sample of this dry material is stored in a glass bottle with a screw top in a drying cabinet at 60° C. for 6 months. No caking takes place.

The entire contents can be emptied out by simply pouring out.

EXAMPLE 2

Preparation of a solid, pourable curing component from a liquid curing agent 100 g of isomerised methyltetrahydrophthalic anhydride with a viscosity of 50 to 100 cP at 25° C., 305 g of quartz powder, 140 g of extremely fine quartz powder and 7.1 g of synthetic calcium silicate (xonotlite) are weighed together at room temperature into a tinplate box and mixed at room temperature for about 1 minute at 1,300 rpm with a paddle stirrer. A pourable powder containing crumbs 2 to 4 mm in size forms.

A sample of this dry material is stored in a glass bottle with a screw top in a drying cabinet at 60° C. for 6 months. No caking takes place.

The entire contents can be emptied out by simply pouring out.

EXAMPLE 3

Preparation of a dry, pourable accelerator from a liquid accelerator 100 g of a curing accelerator consisting of polypropylene glycol 425 which contains about 2% by weight of the corresponding sodium alcoholate, 200 g of quartz powder, 160 g of extremely fine quartz powder and 16 g of synthetic calcium silicate (xonotlite) are weighed together at room temperature into a tinplate box and mixed at room temperature for about 1 minute at 1,300 rpm with a paddle stirrer. A pourable powder forms.

A sample of this dry material is stored in a glass bottle with a screw top in a drying cabinet at 60° C. for 6 months.

The entire contents can be emptied out by simply pouring out.

EXAMPLE 4

Preparation of a pourable mixture from a liquid epoxide resin and a liquid accelerator 100 g of the epoxide resin according to Example 1 are weighed together with 50 g of the accelerator according to Example 3 into a tinplate box, at room temperature, and mixed with a paddle stirrer. 128 g of quartz powder, 106 g of extremely fine quartz powder and 16 g of synthetic calcium silicate (xonotlite) are then weighed in and the whole is mixed for about 1 minute at 1,300 rpm at room temperature. A pulverulent product containing small crumbs results.

The mixture is stable on storage for about 1 month.

EXAMPLE 5

Preparation of a pourable, curable epoxide resin mixture from liquid reactants.

100 g of the mixture according to Example 4 and 80 g of phthalic anhydride are weighed together at room temperature into a tinplate box and mixed for 1 minute at 1,300 rpm with a paddle stirrer.

Pourable crumbs 2 to 3 mm in diameter form. The entire contents can be emptied out by simply pouring out.

The pourable, curable mixture is stable on storage for about 1 month.

Application Examples

EXAMPLE 6

The pourable epoxide resin according to Example 1 is weighed into a tinplate box and warmed to 100° C. on a hotplate, with stirring, and the curing agent and accelerator which have been mentioned in Examples 2 and 3 respectively and which have been pre-warmed to 60° C. are then added, with stirring. The system is then homogenised using a paddle stirrer and, at 80° C., poured into moulds and cured (viscosity at 80° C.: 7,000 to 10,000 mPas).

In a second test, the pourable resin component is brought to the desired temperature in a drying cabinet before the curing agent is added. The mixing operation remains unchanged.

EXAMPLE 7

The pourable curing agent according to Example 2 is weighed into a tinplate box and warmed to 100° C. on a hotplate, with stirring, and a liquid epoxide resin (epoxide resin based on bisphenol A with 8.6 parts by weight of butylene glycol diglycidyl ether, epoxide content about 5.5 equivalents/kg), which has been pre-warmed to about 60° C., and the accelerator (as mentioned in Example 3) are then added, with stirring. The system is then homogenised using a paddle stirrer and, at 80° C., poured into moulds and cured (viscosity at 80° C.: 14,000 to 17,000 mPas).

If desired, in this case also, the pourable curing component can be brought to the desired temperature in a drying cabinet.

EXAMPLE 8

The filled resin/accelerator mixture according to Example 4 is weighed into a tinplate box and warmed to about 100° C. on a hotplate, with stirring, and the hexahydrophthalic anhydride curing agent, which has been pre-warmed to 60° C., is then added, with stirring.

The mixture is then homogenised using a paddle stirrer and, at 80° C., poured into moulds and cured.

EXAMPLE 9

The required amount of the pourable mixture according to Example 5 is weighed into a tinplate box, melted on a hotplate, with stirring, and homogenised, in order then to be poured at 110° C. to 120° C. into moulds and cured.

EXAMPLE 10

Epoxide resin system filled with chalk powder 100 parts by weight of an epoxide resin which has been prepared from bisphenol A and epichlorohydrin and has an epoxide content of 5.3 equivalents per kg are mixed with 330 parts by weight of chalk powder (62.26%, based on the subsequent total mixture) and 0.5 part by weight of XONOTLIT VP 633 to 330 (from Quarzwerke Frechen, Federal Republic of Germany) in a stainless steel vessel, using a turbostirrer at 3,000 revolutions per minute, in the course of 2 minutes to give pourable, non-dusting granules. The granules can be stored in plastic bags without wetting the film surface.

To prepare a castable mixture, 100 parts by weight of modified anhydride curing agent are warmed to 120° C. in a vessel fitted with a stirrer, and the pourable granules are added rapidly and, then, 0.2 part by weight of an anionic accelerator is added. For the production of mouldings, the casting resin mixture is poured, while still hot, into moulds and cured.

EXAMPLE 11

Flame-retardant casting resin system containing $Al_2O_3 \cdot 3H_2O$ 100 parts by weight of an epoxide resin which has been prepared from bisphenol A and epichlorohydrin and has an epoxide content of 5.2 eqivalents per kg and 100 parts by weight of Sikron quartz powder, 170 parts by weight of aluminium oxide trihydrate and 0.5 part by weight of XONOTLIT VP 633-330 are converted, in a stainless steel vessel, using a turbostirrer at 3,000 revolutions per minute, in the course of 2 minutes into pourable, dry, non-caking granules. This filled, dry resin mixture is added to 80 parts by weight of a modified anhydride curing agent, which has been pre-warmed to 80° C., with stirring, and activated with 0.2 part by weight of an anionic accelerator. The resulting casting resin mixture, which is at about 60° C., can be poured into moulds. After curing the mixture for 16 hours at 130° C., flame-retardant mouldings are obtained (UL-V-O).

What is claimed is:

1. A pourable, solid mixture which consists essentially of, based on the total mixture,
   (a) 49.75 to 7.5% by weight of a liquid capable of reacting to form a polymer,
   (b) 50 to 87.5% by weight of a mineral filler, and
   (c) 0.25 to 5% by weight of a crystalline synthetic calcium silicate, which can be in diverse stages of hydration and has a high length/width ratio and a width dimension of less than 1 micron.

2. A mixture according to claim 1, wherein the calcium silicate is acicular crystallised xonotlite of the formula $Ca_6[(OH)_2/Si_6O_{17}]$.

3. A process for the preparation of a pourable, solid mixture according to claim 1 which comprises
   adding components (a), (b) and (c) to a stirred vessel, and
   stirring the resulting mixture to disperse the calcium silicate, component (c), homogeneously therein and to convert the mixture into a solid, dry pourable material.

4. A mixture according to claim 1 wherein the component (a) liquid is isomerized methyltetrahydrophthalic anhydride.

5. A mixture according to claim 1, which contains component (a) in a proportion of 35–15% by weight and component (b) in a proportion of 65–85% by weight.

6. A mixture according to claim 1, wherein the mineral filler is quartz powder, mica, talc, asbestos, slate flour, kaolin, wollastonite, powdered chalk, dolomite, magnesium carbonate, gypsum, barytes, aluminium oxide, bentones, silicic acid aerogel, lithopones, titanium dioxide, carbon black, graphite, metal oxides, glass powders, glass spheres, glass fibres, zinc sulfide, silicon carbide, cristoballite or a mixture of fillers.

7. A mixture according to claim 1, wherein the calcium silicate has a length/width ratio in the range from 10:1 to 200:1.

* * * * *